(12) United States Patent
Horst (10) Patent No.: US 10,399,589 B2
(45) Date of Patent: Sep. 3, 2019

(54) CHILD STROLLER APPARATUS

(71) Applicant: Wonderland Switzerland AG, Steinhausen (CH)

(72) Inventor: Andrew J. Horst, West Lawn, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 6 days.

(21) Appl. No.: 15/498,587

(22) Filed: Apr. 27, 2017

(65) Prior Publication Data

US 2017/0313337 A1    Nov. 2, 2017

Related U.S. Application Data

(60) Provisional application No. 62/329,498, filed on Apr. 29, 2016.

(51) Int. Cl.
*B62B 7/10* (2006.01)
*B62B 7/04* (2006.01)
(Continued)

(52) U.S. Cl.
CPC ............. *B62B 7/10* (2013.01); *B62B 7/044* (2013.01); *B62B 7/062* (2013.01); *B62B 7/08* (2013.01);
(Continued)

(58) Field of Classification Search
CPC ........... B62B 3/007; B62B 5/08; B62B 5/085; B62B 7/10; B62B 7/002; B62B 7/004; B62B 7/006; B62B 7/08; B62B 7/086
See application file for complete search history.

(56) References Cited

U.S. PATENT DOCUMENTS 8,870,213 B1    10/2014 Xu
9,950,730 B2 *   4/2018 Gao ..................... B62B 7/062
(Continued)

FOREIGN PATENT DOCUMENTS

CN    2806265 Y    8/2006
CN   201545035 U   8/2010
(Continued)

OTHER PUBLICATIONS

The Search report from co-pending UK Patent Application No. 1706725.7 dated Sep. 15, 2017.
(Continued)

*Primary Examiner* — James A Shriver, II
*Assistant Examiner* — James J Triggs
(74) *Attorney, Agent, or Firm* — Baker & McKenzie LLP (57) ABSTRACT

A child stroller apparatus includes a rear leg frame having a first side segment fixedly connected with a first coupling part, a front leg frame having a second side segment fixedly connected with a second coupling part, a handle frame having a third side segment fixedly connected with a third coupling part, the second and third coupling parts being respectively connected pivotally with the first coupling part, a front guard pivotally connected with the first coupling part, a first linking assembly rotationally coupling the second side segment with the third side segment, and a second linking assembly rotationally coupling the front guard with the second side segment. The front leg frame, the handle frame and the front guard are linked and rotatable relative to the rear leg frame during folding and unfolding of the child stroller apparatus.

16 Claims, 11 Drawing Sheets

(51) Int. Cl.
 *B62B 9/20* (2006.01)
 *B62B 7/08* (2006.01)
 *B62B 7/06* (2006.01)

(52) U.S. Cl.
 CPC ............... *B62B 9/20* (2013.01); *B62B 7/064* (2013.01); *B62B 2205/003* (2013.01); *B62B 2205/18* (2013.01); *B62B 2205/20* (2013.01); *B62B 2205/22* (2013.01)

(56) References Cited

U.S. PATENT DOCUMENTS

| | | | |
|---|---|---|---|
| 2003/0062709 | A1 | 4/2003 | Newhard |
| 2008/0185821 | A1* | 8/2008 | Chen .................. B62B 7/083 280/642 |
| 2011/0084467 | A1 | 4/2011 | Liao |
| 2011/0298198 | A1* | 12/2011 | Minato ............... B62B 7/062 280/648 |
| 2012/0032419 | A1 | 2/2012 | Li |
| 2013/0140797 | A1 | 6/2013 | Fritz et al. |
| 2013/0207369 | A1 | 8/2013 | Pollack |
| 2014/0145417 | A1 | 5/2014 | Li |
| 2017/0144687 | A1* | 5/2017 | Li .................... B62B 7/062 |

FOREIGN PATENT DOCUMENTS

| | | |
|---|---|---|
| CN | 202574327 U | 12/2012 |
| CN | 203142742 U | 8/2013 |
| CN | 204161429 U | 2/2015 |
| CN | 105460065 A | 4/2016 |
| EP | 2502801 A1 | 9/2012 |
| EP | 3002175 A1 | 6/2016 |
| NL | 1018648 C | 1/2003 |
| WO | 2005108181 A2 | 11/2005 |

OTHER PUBLICATIONS

The Examination Report dated Sep. 26, 2018 from co-pending UK Patent Application No. 1706725.7.

The Search Report dated Sep. 26, 2018 from co-pending UK Patent Application No. 1706725.7.

A Second Examination Notice issued by the State Intellectual Property Office of China on May 24, 2019 in connection with Application No. 201710294064.0.

* cited by examiner

CHILD STROLLER APPARATUS

CROSS-REFERENCE TO RELATED APPLICATION(S)

This application claims priority to U.S. Provisional Patent Application No. 62/329,498 filed on Apr. 29, 2016, the disclosure of which is incorporated herein by reference.

BACKGROUND

1. Field of the Invention

The present invention relates to child stroller apparatuses.

2. Description of the Related Art

Some child strollers such as jogging strollers may have large frame geometries and wheels of greater diameters so as to provide comfortable ride for a child occupant. Unfortunately, this type of child strollers are often difficult to store and transport owing to the larger size. Therefore, there is a need for a child stroller apparatus that is easy to operate and address at least the foregoing issues.

SUMMARY

The present application describes a child stroller apparatus that is easy to operate, and can fold into a compact form. According to an example of implementation, the child stroller apparatus includes a rear leg frame having a first side segment fixedly connected with a first coupling part, a front leg frame having a second side segment fixedly connected with a second coupling part, a handle frame having a third side segment fixedly connected with a third coupling part, the second and third coupling parts being respectively connected pivotally with the first coupling part, a front guard pivotally connected with the first coupling part, a first linking assembly rotationally coupling the second side segment with the third side segment, and a second linking assembly rotationally coupling the front guard with the second side segment, thereby the front leg frame, the handle frame and the front guard are linked and are rotatable relative to the rear leg frame during folding and unfolding of the child stroller apparatus.

According to another example, the child stroller apparatus includes a rear leg frame having a first side segment, a front leg frame having a second side segment, a handle frame having a third side segment and a grip portion, the second and third side segments being respectively connected pivotally with the first side segment, the grip portion being fixedly connected with a first joining part, and the third side segment being further fixedly connected with a second joining part that is pivotally connected with the first joining part. The child stroller apparatus further includes a latch disposed in an inner cavity at least partially defined by the first and second joining parts, the latch being operable to lock the grip portion in an unfolded position relative to the third side segment, and a cable having two opposite ends respectively anchored with the grip portion and the third side segment and wrapping around a prominent portion provided on one of the first and second joining parts, the cable being tensioned so as to bias the grip portion to fold toward the third side segment.

DETAILED DESCRIPTION OF THE EMBODIMENTS

Figure 1:
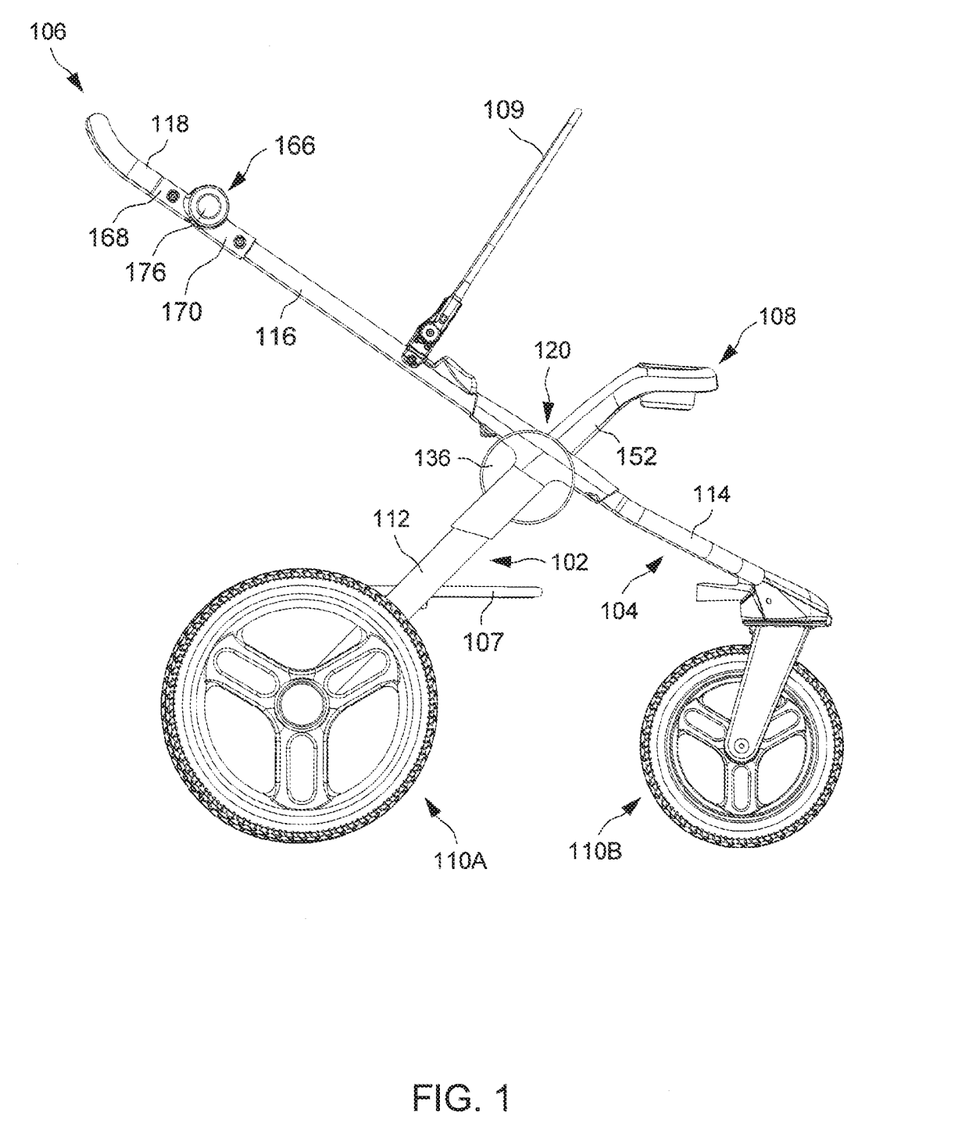
FIG. 1 is a side view illustrating an embodiment of a child stroller apparatus.
Figure 2:
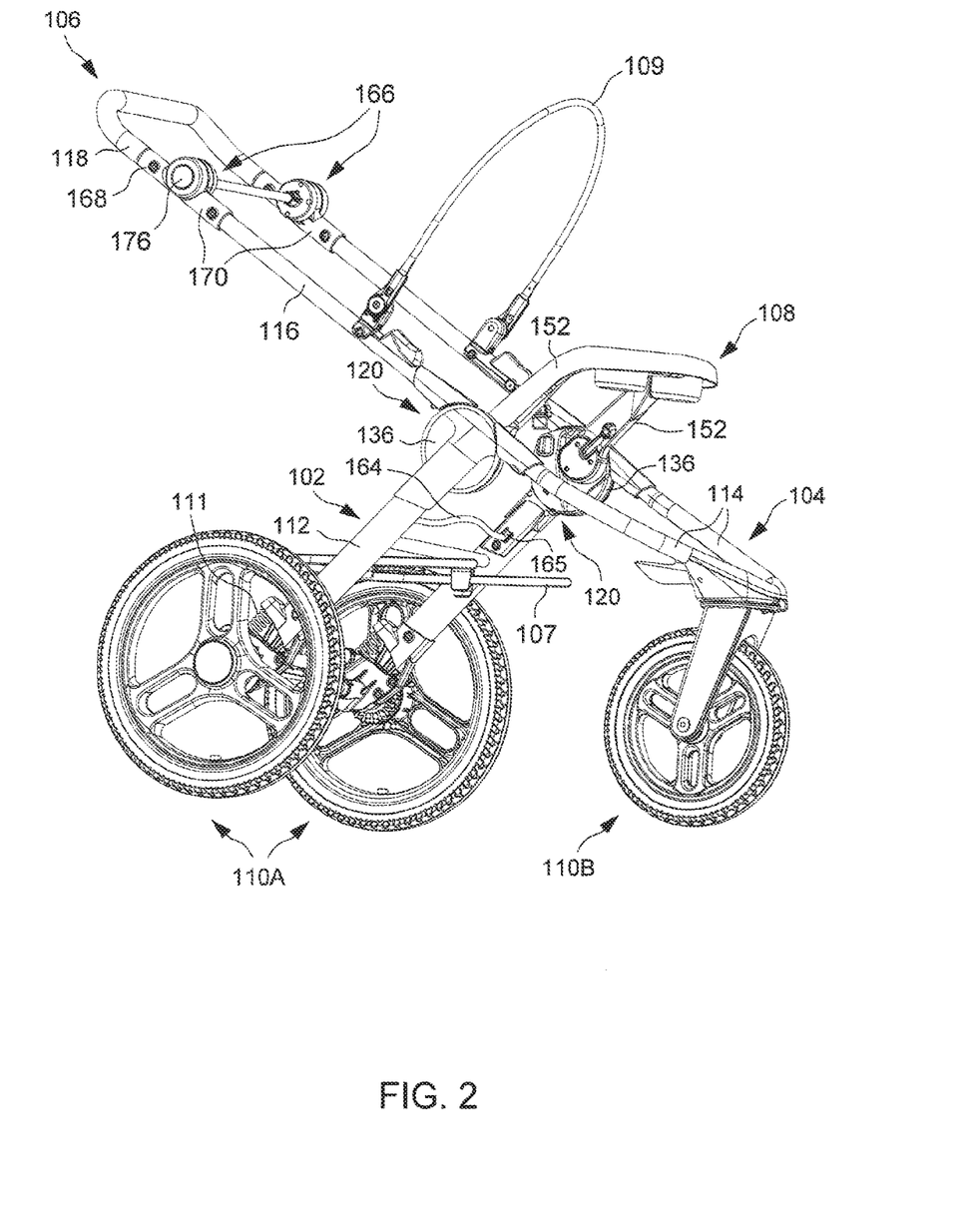
FIG. 2 is a perspective view of the child stroller apparatus.

FIG. 1 is a side view illustrating an embodiment of a child stroller apparatus 100, and FIG. 2 is a perspective view of the child stroller apparatus 100. Examples of implementation for the child stroller apparatus 100 can include, without limitation, jogging strollers. Referring to FIGS. 1 and 2, the child stroller apparatus 100 can include a rear leg frame 102, a front leg frame 104, a handle frame 106 and a front guard 108. The rear leg frame 102 can be assembled with a basket frame 107, and the handle frame 106 can be assembled with a canopy frame 109. Moreover, the rear and front leg frames 102 and 104 are respectively provided with wheel assemblies 110A and 110B. According to an example of construction, the rear leg frame 102 may be provided with two wheel assemblies 110A, and the front leg frame 104 may be provided with one single wheel assembly 110B. Each of the wheel assemblies 110A of the rear leg frame 102 may include suspension features 111.

Each of the rear leg frame 102, the front leg frame 104 and the handle frame 106 may have a generally symmetrical construction including two parallel side segments respectively disposed at a left and a right side of the child stroller apparatus 100, e.g., two side segments 112 for the rear leg frame 102, two side segments 114 for the front leg frame 104, and two side segments 116 for the handle frame 106. Moreover, the handle frame 106 can further include a grip portion 118 extending transversally that is respectively connected pivotally with the two side segments 116. The side segments 112, 114 and 116 and the grip portion 118 can include, for example, tube portions. The side segments 112, 114 and 116 at each of the left and right sides are connected with one another via one joint structure 120. The two joint structures 120 on the left and right sides are generally similar in construction, and allow the front leg frame 104, the handle frame 106 and the front guard 108 to rotate in unison relative to the rear leg frame 102 for folding and unfolding the child stroller apparatus 100.

Figure 3:
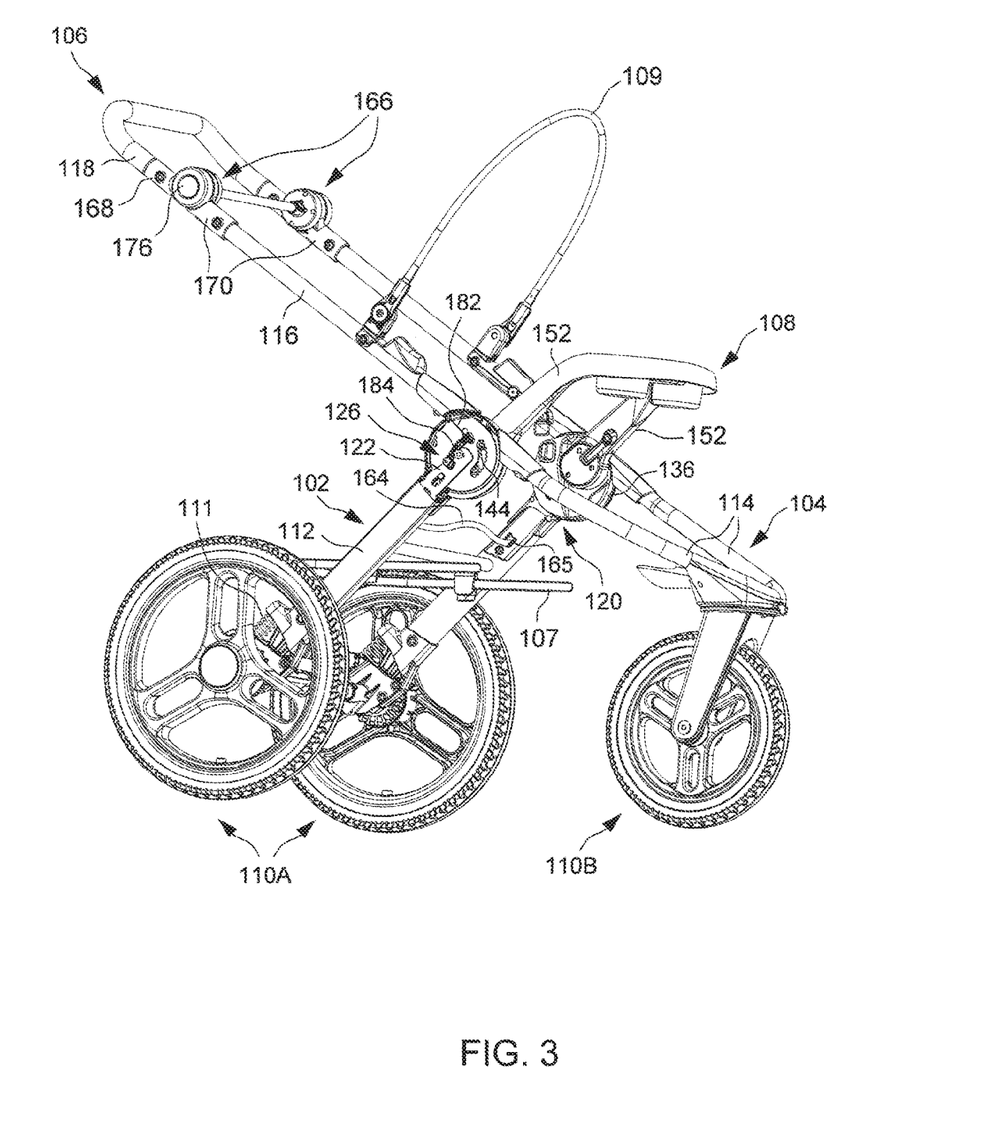
FIG. 3 is a perspective view of the child stroller apparatus showing some inner construction details of a joint structure connecting with a rear leg frame, a front leg frame, a handle frame and a front guard of the child stroller apparatus.
Figure 4:
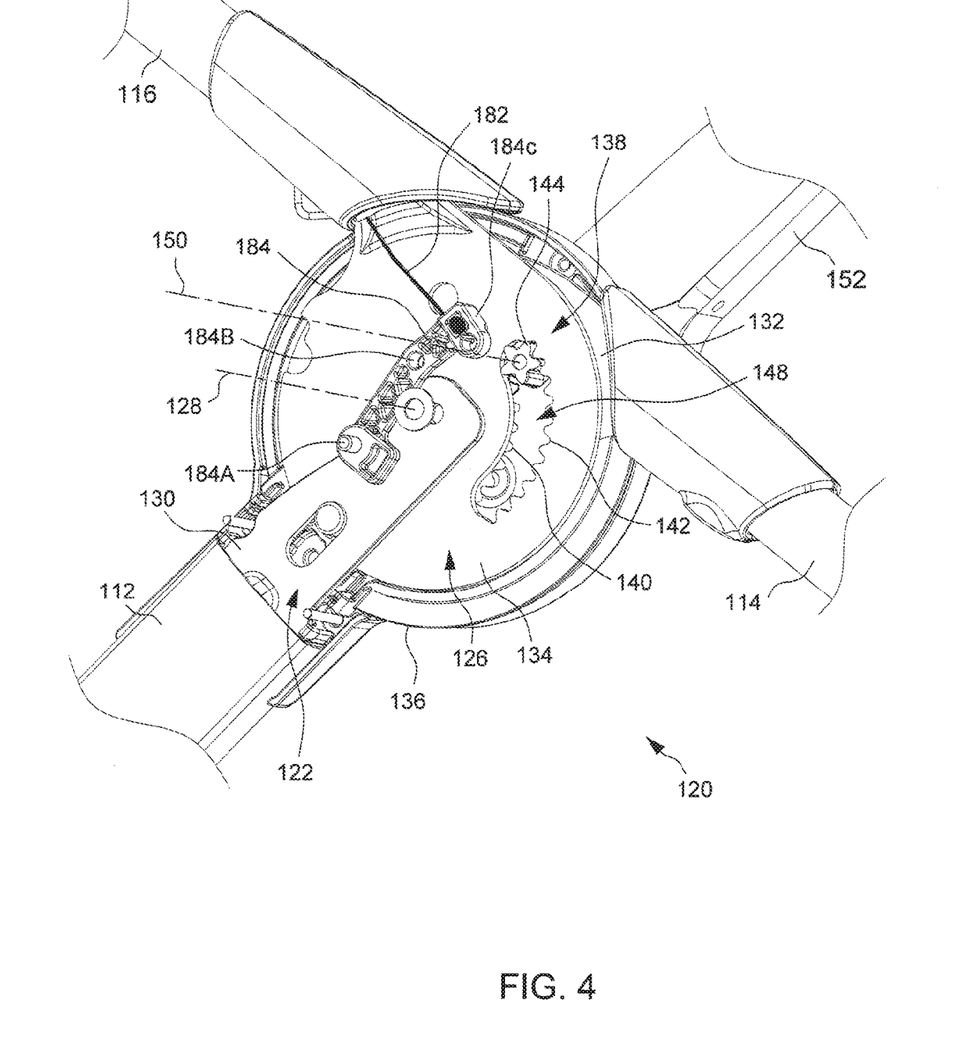
FIG. 4 is an enlarged view illustrating some inner construction details of the joint structure viewed from an outer side thereof.
Figure 5:
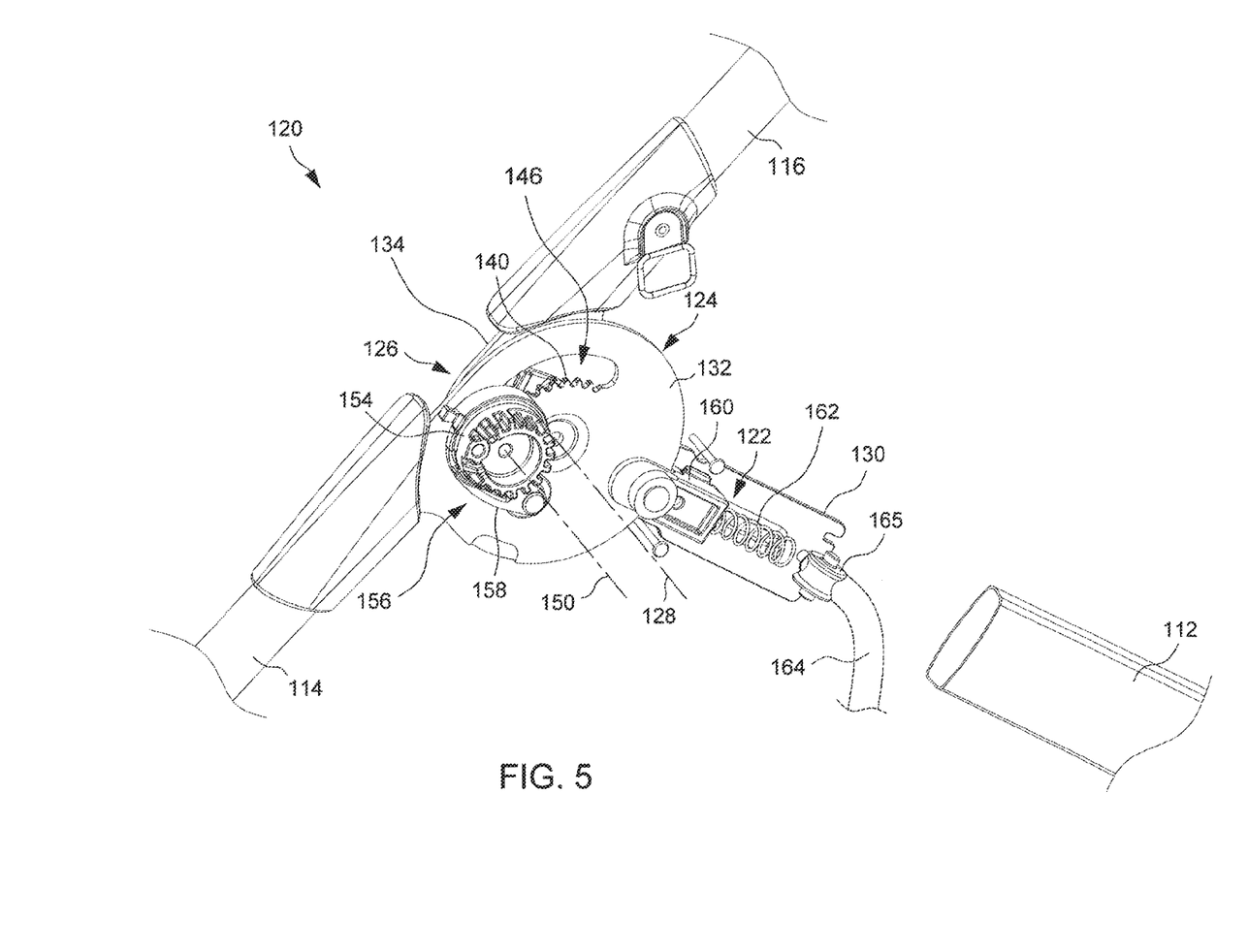
FIG. 5 is a perspective view illustrating some inner construction details of the joint structure viewed from an inner side thereof.

In conjunction with FIGS. 1 and 2, FIG. 3 is a perspective view of the child stroller apparatus 100 showing some inner construction details of the joint structure 120 viewed from an outer side thereof, and FIG. 4 is an enlarged view illustrating some inner construction details of the joint structure 120 viewed from an outer side thereof, and FIG. 5 is a perspective view illustrating some inner construction details of the joint structure 120 viewed from an inner side thereof. Referring to FIGS. 3-5, the joint structure 120 can include three coupling parts 122, 124 and 126 respectively connected fixedly with the side segment 112 of the rear leg frame 102, the side segment 114 of the front leg frame 104, and the side segment 116 of the handle frame 106. The coupling parts 124 and 126 can be respectively connected pivotally with the coupling part 122 about a same pivot axis 128. For example, the coupling parts 122, 124 and 126 can respectively include rigid plates 130, 132 and 134, and the respective rigid plates 132 and 134 of the coupling parts 124 and 126 can be pivotally connected with the rigid plate 130 of the coupling part 122 about the pivot axis 128. In addition, the coupling part 122 may further include a shell 136 that is fixedly attached to the side segment 112 of the rear leg frame 102, the rigid plates 130, 132 and 134 being received at least partially in the shell 136. Some portion of the shell 136 has been omitted in FIGS. 3-5 to better show the inner construction of the joint structure 120.

Referring to FIGS. 3-5, the joint structure 120 further includes a linking assembly 138 that rotationally couples the side segment 114 of the front leg frame 104 with the side segment 116 of the handle frame 106, thereby the front leg frame 104 and the handle frame 106 are rotatable in unison about the pivot axis 128 relative to the rear leg frame 102 during folding and unfolding of the child stroller apparatus 100. The linking assembly 138 can include a toothed portion 140 provided on the coupling part 124, another toothed portion 142 provided on the coupling part 126, and a gear 144 pivotally assembled with the coupling part 122. According to an example of construction, two arcuate slots 146 and 148 centered on the pivot axis 128 may be respectively provided in the two coupling parts 124 and 126 (e.g., the arcuate slots 146 and 148 may be respectively formed through the rigid plates 132 and 134), the toothed portion 140 may be disposed adjacent to an inner rim of the arcuate slot 146, and the toothed portion 142 may be disposed adjacent to an outer rim of the arcuate slot 148. The two toothed portions 140 and 142 can respectively extend along two concentric arcs that are centered on the pivot axis 128.

The gear 144 can be pivotally assembled with the coupling part 122 about a pivot axis 150 spaced apart from the pivot axis 128, and can be in meshing engagement with the toothed portions 140 and 142 of the two coupling parts 124 and 126. During folding and unfolding of the child stroller apparatus 100, the front leg frame 104 and the handle frame 106 can be thereby rotationally coupled with each other, the gear 144 rotating about the pivot axis 150 relative to the coupling part 122 and moving along the two arcuate slots 146 and 148 relative to the two coupling parts 124 and 126 as the front leg frame 104 and the handle frame 106 rotate in unison relative to the rear leg frame 102.

Referring to FIGS. 1-5, the front guard 108 can exemplary include a tray on which various objects or items may be placed for use. The front guard 108 can extend transversally across a width of the child stroller apparatus 100, and can be respectively connected pivotally with the side segment 112 of the rear leg frame 102 adjacent to the joint structure 120 on each of the left and right sides. According to an example of construction, the front guard 108 can have two side portions 152 that are respectively connected pivotally with the two coupling parts 122 (e.g., the coupling shell 136 thereof) of the side segments 112 about the pivot axis 150. The pivot connection of the front guard 108 with the coupling part 122 can exemplary include a coupling mount 154, which is pivotally connected with the shell 136 of the coupling part 122 about the pivot axis 150 and can be fixedly attached to one corresponding side portion 152 of the front guard 108. The front guard 108 and the gear 144 are thus pivotally assembled about the same pivot axis 150, and the gear 144 is rotatable about the pivot axis 150 relative to the front guard 108 during folding and unfolding of the child stroller apparatus 100.

The joint structure 120 further includes another linking assembly 156 that rotationally couples the front guard 108 with the side segment 114 of the front leg frame 104 at each of the left and right sides. According to an example of construction, the linking assembly 156 can include a linking member 158 that is respectively connected pivotally with the front guard 108 and the coupling part 124 of the side segment 114. The linking member 158 can be a single part having an elongate shape, and can be enclosed at least partially inside the shell 136 of the coupling part 122. Examples of the linking member 158 can include, without limitation, a rod, a bar, a plate, and the like. A first end of the linking member 158 can be pivotally connected with the coupling mount 154 at a location eccentric from the pivot axis 150, and a second end of the linking member 158 can be pivotally connected with the coupling part 124 at a location eccentric from the pivot axis 128. With the coupling of the linking assembly 156, the front leg frame 104 and the front guard 108 can rotate in unison about their respective pivot axes 128 and 150 relative to the rear leg frame 102.

Figure 6:
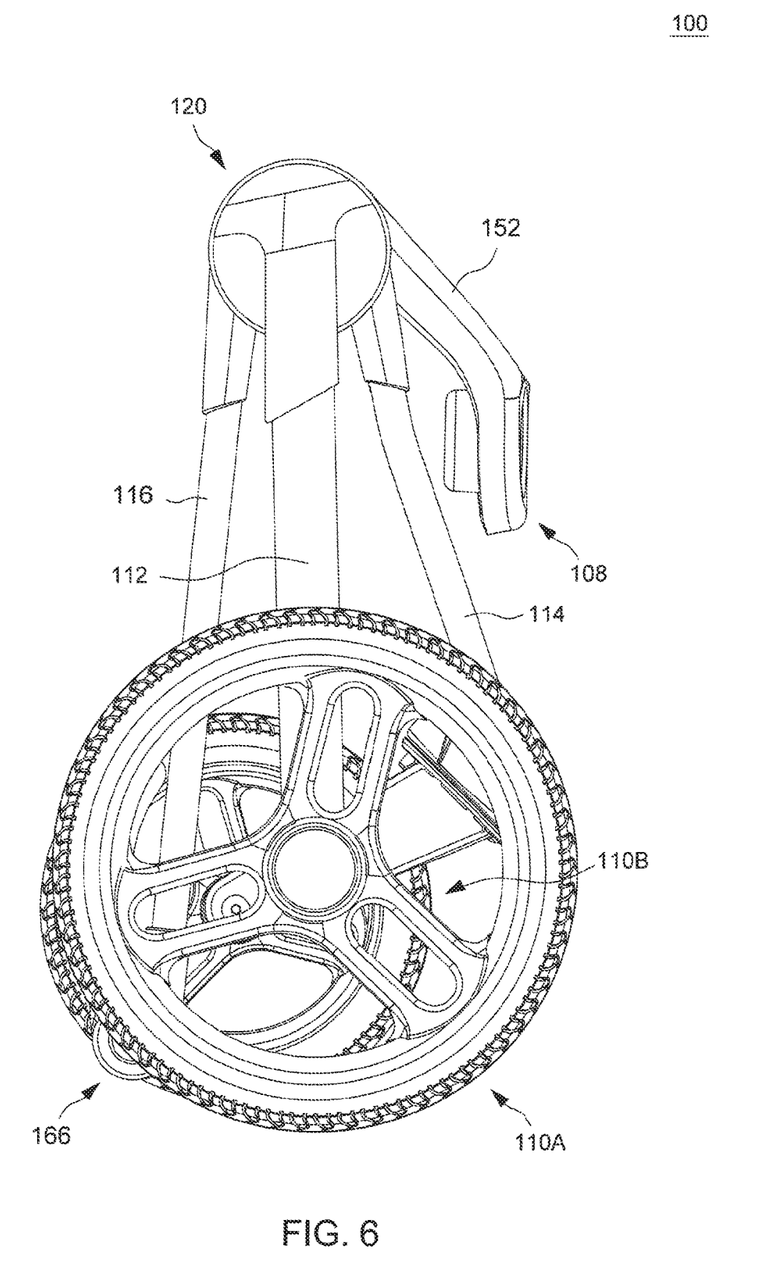
FIG. 6 is a side view illustrating the child stroller apparatus in a folded state.
Figure 7:
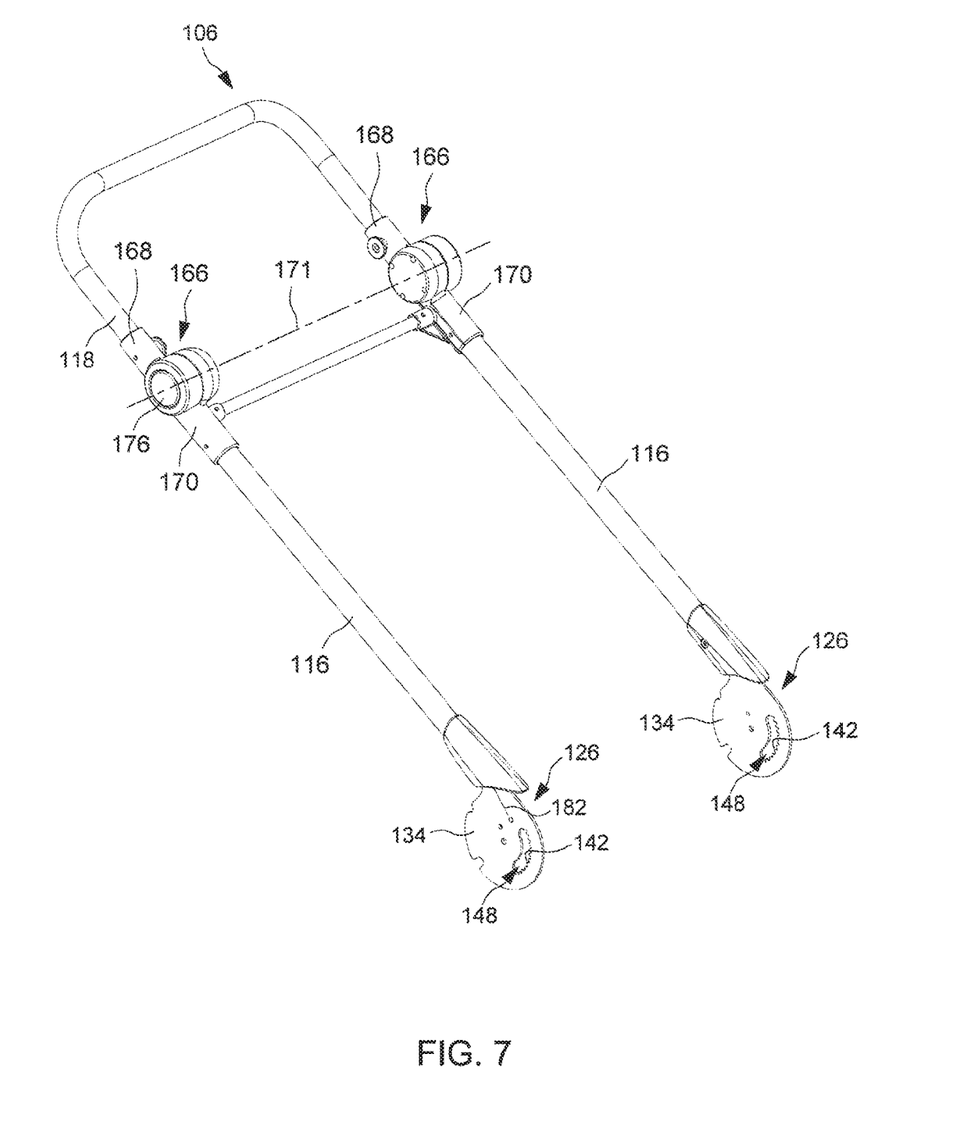
FIG. 7 is a perspective view illustrating the handle frame of the child stroller apparatus having a grip portion in an unfolded position.
Figure 8:
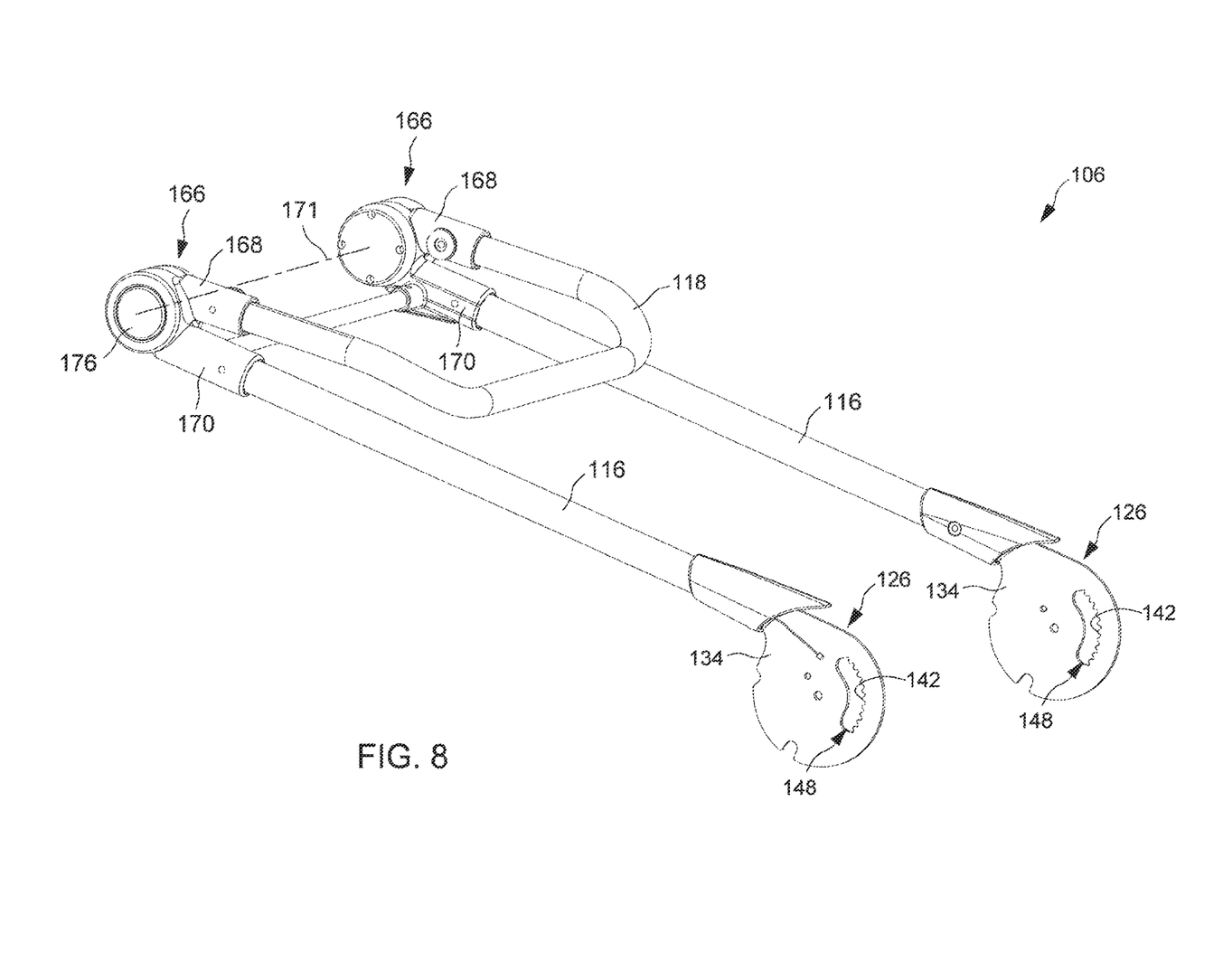
FIG. 8 is a perspective view illustrating the grip portion of the handle frame in a folded position.

With the linking assemblies 138 and 156, the front leg frame 104, the handle frame 106 and the front guard 108 are linked and can rotate in unison relative to the rear leg frame 102 for folding and unfolding the child stroller apparatus 100. The child stroller apparatus 100 is shown in the unfolded state for use in FIG. 1, and in the folded or collapsed state in FIG. 6. In the unfolded state, the rear leg frame 102 and the front leg frame 104 are opened so as to provide stable standing support, the handle frame 106 can project generally upward and rearward from the joint structures 120, and the front guard 108 can project generally upward and forward from the joint structures 120. In the folded state, the front leg frame 104, the handle frame 106 and the front guard 108 can respectively collapse toward the rear leg frame 102, the handle frame 106 being collapsed at one side of the rear leg frame 102, and the front leg frame 104 and the front guard 108 being collapsed at another opposite side of the rear leg frame 102. The folded state of the child stroller apparatus 100 is very compact, which can facilitate its transport and storage.

Referring to FIGS. 1-5, a latch mechanism may be provided to lock the child stroller apparatus 100 in the unfolded state. This latch mechanism may be respectively assembled adjacent to the joint structure 120 on each of the left and right sides, and can include a latch 160 and a spring 162. The latch 160 can be slidably assembled with the coupling part 122, and can be disposed near the coupling parts 124 and 126. The latch 160 can move relative to the coupling part 122 and engage with one or both of the coupling parts 124 and 126 for locking the rear and front leg frames 102 and 104, the handle frame 106 and the front guard 108 in the unfolded state for use. For example, the coupling parts 124 and 126 may respectively have grooves that become aligned with each other when the child stroller apparatus 100 is unfolded, and the latch 160 can engage with the aligned grooves of the coupling parts 124 and 126 to lock the child stroller apparatus 100 in the unfolded state. Moreover, the latch 160 can disengage from the coupling parts 124 and 126 to allow concurrent rotation of the front leg frame 104, the handle frame 106 and the front guard 108 relative to the rear leg frame 102 for folding or unfolding of the child stroller apparatus 100.

The spring 162 can have two opposite ends respectively connected with the latch 160 and an anchoring feature provided on the coupling part 122. The spring 162 can bias the latch 160 to a locking state for engagement with the coupling parts 124 and 126.

In addition, the latch 160 can be connected with a release member 164 (shown with phantom lines in FIG. 5), which is operable to urge the latch 160 to move against the biasing force of the spring 162 to an unlocking state and disengage from the coupling parts 124 and 126. According to an example of construction, the release member 164 can extend transversally across a width of the child stroller apparatus 100, and may include a flexible strap or web. The displacement of the release member 164 may be guided by a roller 165 assembled with the side segment 112. The release member 164 may be pulled upward to cause movement of the latch 160 toward its unlocking state against the biasing force of the spring 162, thereby allowing folding of the child stroller apparatus 100. According to an example of construction, the same assembly of the latch 160 and the spring 162 can be respectively provided at the left and right side, and the release member 164 can be oppositely connected with the two latches 160 so that it can be operable to drive concurrent unlocking of the two latches 160.

In conjunction with FIGS. 1 and 2, FIGS. 7 and 8 are schematic views illustrating the grip portion 118 of the handle frame 106 respectively in an unfolded position and a folded position relative to the two side segments 116. The grip portion 118 of the handle frame 106 can be respectively connected pivotally with the side segment 116 on each of the left and right sides via a joint structure 166, which is disposed at an end of the side segment 116 that is opposite to the other end of the side segment 116 where is assembled the joint structure 120 coupling with the rear leg frame 102, the front leg frame 104 and the handle frame 106. The grip portion 118 of the handle frame 106 can thereby rotate relative to the two side segments 116 between an unfolded position where the grip portion 118 generally stretches away from the two side segments 116, and a folded position where the grip portion 118 is folded over the two side segments 116 for reducing the size of the handle frame 106. The grip portion 118 can be in its unfolded position when the child stroller apparatus 100 is in the unfolded state, and in its folded position when the child stroller apparatus 100 is in the folded state.

Figure 9:
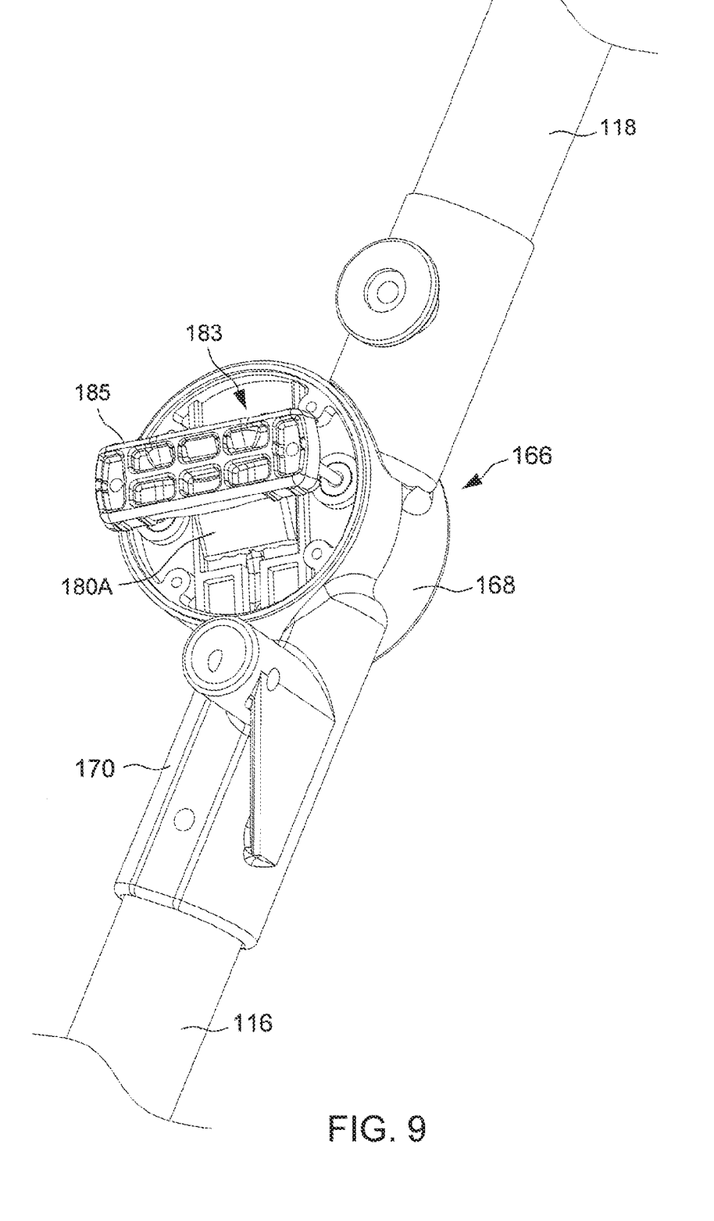
FIG. 9 is a perspective view illustrating some inner construction details of a joint structure connecting with the grip portion and a side segment of the handle frame.
Figure 10:
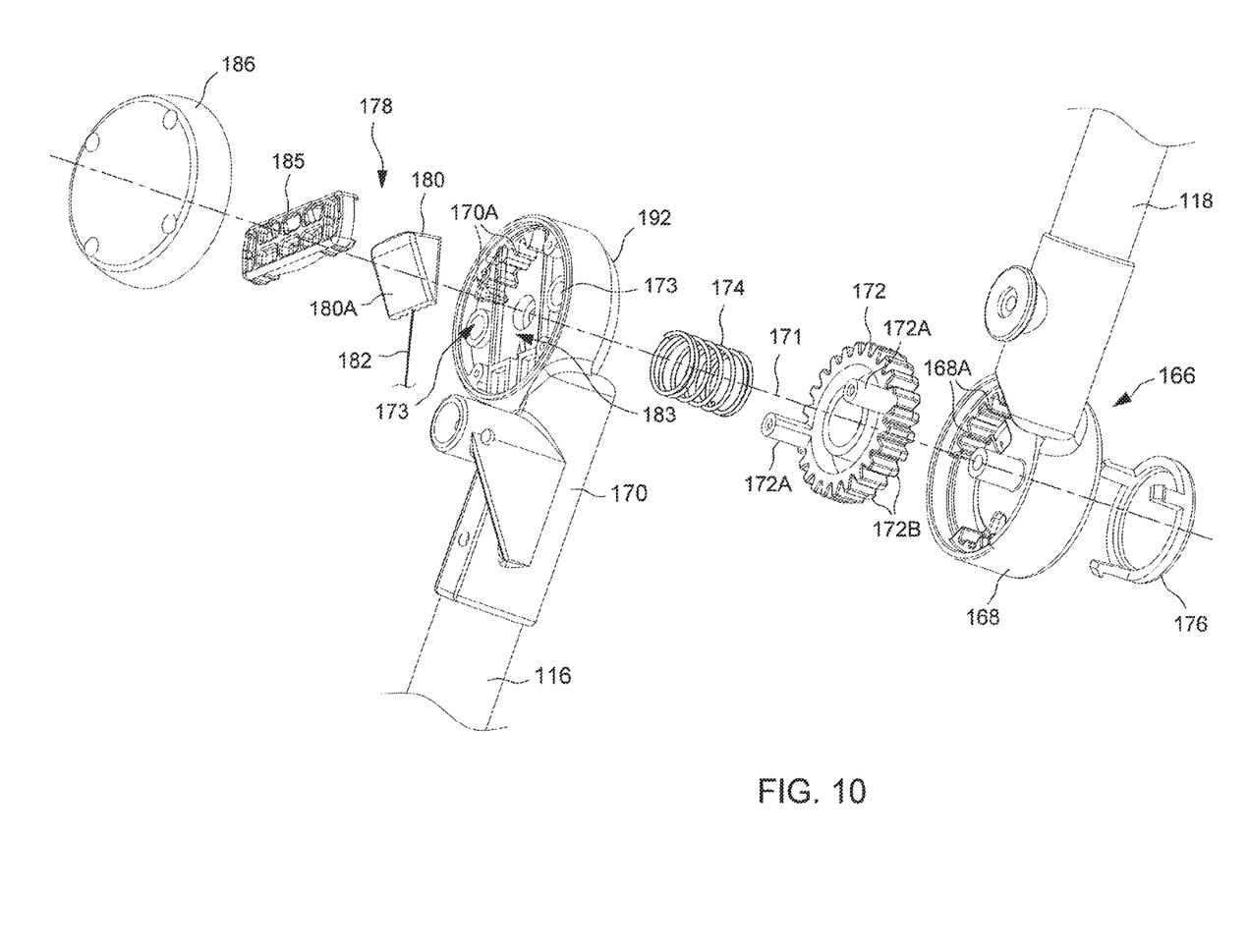
FIG. 10 is an exploded view illustrating inner construction details of the joint structure connecting with the grip portion and the side segment of the handle frame.

FIG. 9 is a perspective view illustrating some inner construction details of a joint structure 166 that pivotally connects the grip portion 118 with one side segment 116, and FIG. 10 is an exploded view of the joint structure 166. Referring to FIGS. 9 and 10, the joint structure 166 can include two joining parts 168 and 170 respectively connected fixedly with an end of the grip portion 118 and an end of the side segment 116. The joining parts 168 and 170 can be pivotally connected with each other about a pivot axis 171 around which the grip portion 118 is rotatable relative to the side segment 116 between the unfolded position and the folded position.

Moreover, the handle frame 106 can be further assembled with a latch 172 operable to rotationally lock the grip portion 118 with respect to the side segment 116. The latch 172 can be assembled in an inner cavity at least partially defined by the joining parts 168 and 170. For example, the latch 172 may be assembled for sliding movement along the pivot axis 171 inside the inner cavity of the joining parts 168 and 170, this sliding connection including shaft portions 172A provided on the latch 172 that are slidably received through holes 173 provided in the joining part 170. The latch 172 is thereby movable to engage with the two joining parts 168 and 170 for rotationally locking the grip portion 118 with respect to the side segment 116 (e.g., in the unfolded position only or in both the unfolded and folded positions), and to disengage from one of the two joining parts 168 and 170 (e.g., the joining part 168) to unlock the grip portion 118 and allow its rotation between the unfolded position and the folded position. According to an example of construction, each of the joining parts 168 and 170 may have an interior provided with a plurality of teeth (teeth 168A for the joining part 168, and teeth 170A for the joining part 170), and the latch 172 may have a circumference provided with a plurality of teeth 172B. The latch 172 can slide between a locking state where the teeth 172B of the latch 172 engage with the respective teeth of the joining parts 168 and 170 to rotationally lock the grip portion 118 with respect to the side segment 116, and an unlocking state where the teeth 172B of the latch 172 disengage from the teeth of one of the joining parts 168 and 170 (e.g., teeth 168A of the joining part 168) for rotation of the grip portion 118 relative to the side segment 116.

The latch 172 can be connected with a spring 174, which is operable to bias the latch 172 to the locking state. According to an example of implementation, the spring 174 may have two opposite ends respectively connected with the latch 172 and an inner side wall of the joining part 170.

In addition, the joining part 168 may be assembled with a release button 176 exposed outward. The release button 176 can be operable to contact and push the latch 172 to its unlocking state for rotation of the grip portion 118 relative to the side segment 116.

For facilitating unlocking of the grip portion 118, a linking mechanism 178 can couple the latch 172 with the handle frame 106 so that a folding rotation of the handle frame 106 can drive the latch 172 to move and unlock the grip portion 118. Referring to FIGS. 4 and 10, the linking mechanism 178 can include a release actuator 180, a cable 182 and a cable actuator 184 (better shown in FIG. 4). The release actuator 180 can have a ramp surface 180A, and can be assembled inside the joint structure 166 for sliding movement along a plane that is substantially perpendicular to the pivot axis 171. For example, the release actuator 180 may be slidably assembled in a guide slot 183 provided on a side of the joining part 170 opposite to that where are disposed the teeth 170A.

The release actuator 180 can operatively connect with the latch 172. For example, the latch 172 can include a plate 185 that is fixedly connected with the respective ends of the shaft portions 172A, and the release actuator 180 can slide through a gap between the plate 185 and the guide slot 183 with the ramp surface 180A in sliding contact with the plate 185. Owing to the sliding contact with the ramp surface 180A, the latch 172 can be pushed by the release actuator 180 to move to its unlocking state. The joining part 170 may further include a cover 186 that is fixedly attached to close the inner cavity in which is assembled the release actuator 180 and the plate 185.

Referring to FIG. 4, the cable actuator 184 can be respectively connected pivotally with the coupling part 122 (e.g., the rigid plate 132 thereof) affixed to the side segment 112 of the rear leg frame 102 via a pivot connection 184A, and with the coupling part 126 (e.g., the rigid plate 134 thereof) affixed to the side segment 116 of the handle frame 106 via a pivot connection 184B. Moreover, the cable actuator 184 can have an anchoring portion 184C for connection with the cable 182. According to an example of construction, the cable actuator 184 may be provided as a single part having an elongate shape, such as a bar, a rod and the like. The pivot connection 184B may be located between the pivot connection 184A and the anchoring portion 184C along the cable actuator 184. The cable actuator 184 can rotate relative to the coupling parts 122 and 126 during rotation of the handle frame 106 relative to the rear leg frame 102 for folding or unfolding the child stroller apparatus 100, the anchoring portion 184C moving closer to the pivot axis 128 when the handle frame 106 rotates in the folding direction and away from the pivot axis 128 when the handle frame 106 rotates in the unfolding direction.

The cable 182 can extend along a hollow interior of the side segment 116, and can have two opposite ends respectively connected with the release actuator 180 and the anchoring portion 184C of the cable actuator 184.

With the aforementioned assembly, a folding rotation of the handle frame 106 relative to the rear leg frame 102 can cause the cable actuator 184 to move relative to the coupling parts 122 and 126 and pull on the cable 182, which in turn can draw the release actuator 180 to slide and urge the latch 172 to move for disengaging from the joining part 168 owing to the sliding contact between the ramp surface 180A and the plate 185 of the latch 172, thereby unlocking the grip portion 118 with respect to the side segment 116. Accordingly, the grip portion 118 can be automatically unlocked by a folding rotation of the handle frame 106, without the need of operating the release button 176. Once it is unlocked, the grip portion 118 can be rotated over the side segments 116 to fold the handle frame 106.

Figure 11:
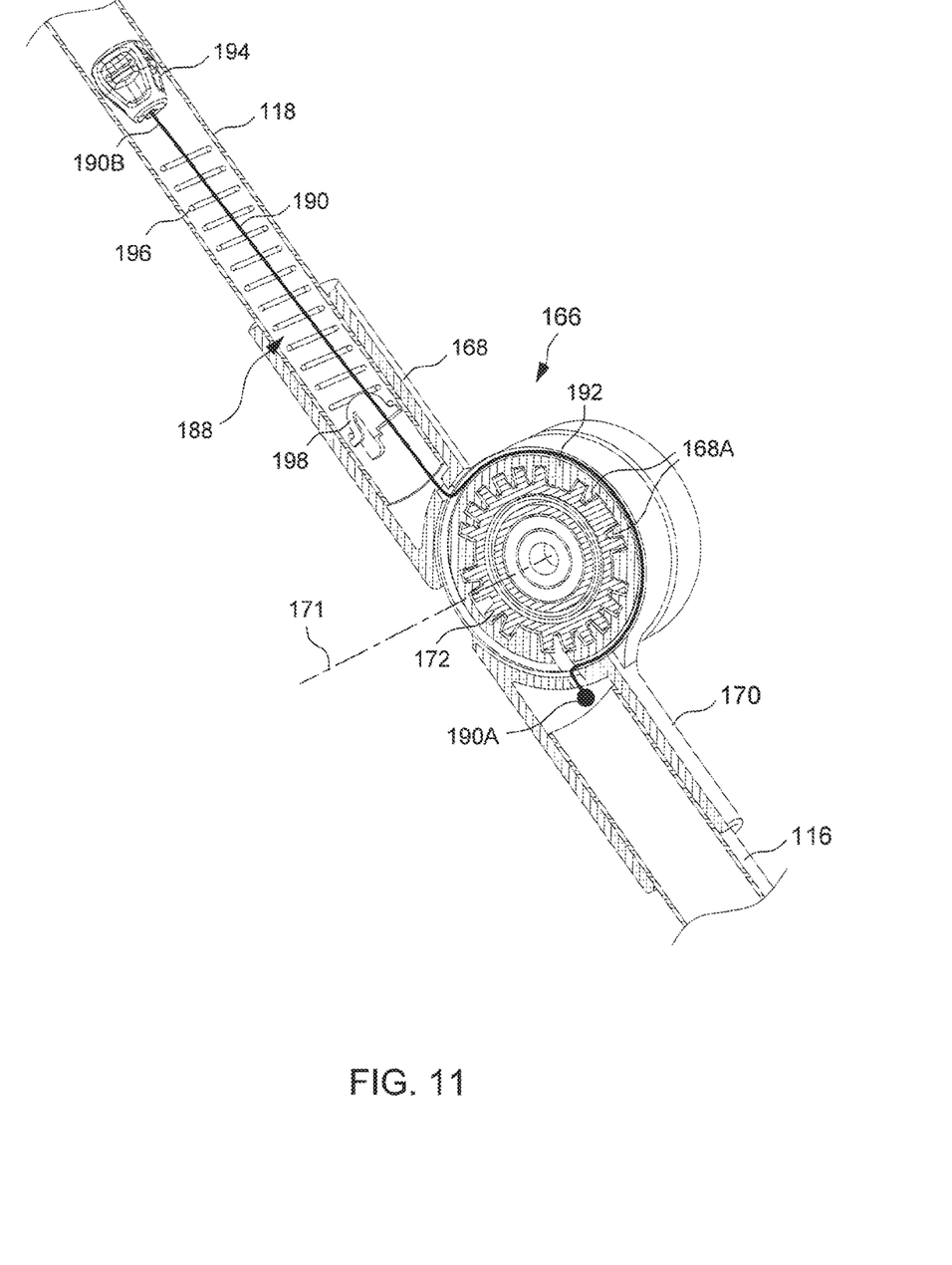
FIG. 11 is a cross-sectional view illustrating a biasing mechanism operable to apply a biasing force that can assist in folding the grip portion over the side segment of the handle frame.

For facilitating folding of the grip portion 118 over the side segments 116, some implementation may further include a biasing mechanism configured to draw the grip portion 118 toward the side segments 116. In conjunction with FIG. 10, FIG. 11 is a schematic cross-sectional view illustrating a biasing mechanism 188 operable to apply a biasing force that can assist in folding the grip portion 118 over the side segment 116. The biasing mechanism 188 can include a tensioned cable 190 that is coupled with the grip portion 118 and the side segment 116. The tensioned cable 190 wraps at least partially around a prominent portion 192 provided on one of the two joining parts 168 and 170, and has two opposite ends 190A and 190B respectively anchored with the side segment 116 and the grip portion 118. According to an example of implementation, the prominent portion 192 may be a rounded portion of the joining part 168 having an inner side provided with the teeth 168A, and can be received at least partially in the joining part 168 of the grip portion 118. The cable 190 can wrap in contact with the prominent portion 192.

The cable 190 is assembled in a tensioned state. According to an implementation, the end 190A of the cable 190 may be fixedly connected with the joining part 170 or side segment 116, and the other end 190B of the cable 190 may be fixedly attached to a cable anchor 194 that is slidably assembled with the grip portion 118. The cable anchor 194 may be disposed inside the grip portion 118 at a location distant from the joint structure 166, and can be coupled with a spring 196. The spring 196 can have two opposite ends respectively connected with the cable anchor 194 and an anchoring feature 198 fixedly provided in the grip portion 118. The spring 196 can bias the cable anchor 194 away from the prominent portion 192 so as to tension the cable 190. As a result, the tensioned cable 190 can constantly apply a torque that rotationally bias the grip portion 118 in a folding direction toward the side segment 116. Once the latch 172 unlocks the grip portion 118, the biasing force applied by the tensioned cable 190 can assist in rotating the grip portion 118 relative to the side segment 116 from the unfolded position toward the folded position.

Exemplary operation of the child stroller apparatus 100 is described hereinafter with reference to FIGS. 1-11. For collapsing the child stroller apparatus 100, a caregiver can pull the release member 164 upward, which can urge the latch 160 on each of the left and right sides to unlock the front leg frame 104 and the handle frame 106. As the caregiver further use the release member 164 to lift the child stroller apparatus 100 above a floor surface, the front leg frame 104 and the front guard on one side, and the handle frame 106 on the other side, can drop in unison in opposite directions owing to gravity action for folding the child stroller apparatus 100. The folding rotation of the handle frame 106 toward the rear leg frame 102 can drive the cable actuator 184 to move and pull on the cable 182 so that the release actuator 180 drawn by the cable 182 urges the latch 172 to move for unlocking the grip portion 118 with respect to the side segment 116. Once the grip portion 118 is unlocked, the tensioned cable 190 can urge the grip portion 118 to rotate and fold over the side segment 116. Accordingly, a caregiver can easily fold the child stroller apparatus 100 with one hand performing one operating step.

For unfolding the child stroller apparatus 100, the front leg frame 104 and the handle frame 106 can be reversely rotated in unison away from the rear leg frame 102. Once the child stroller apparatus 100 is fully unfolded, the latch 160 on each of the left and right sides can lock the front leg frame 104 and the handle frame 106 in position. Then the caregiver can rotate the grip portion 118 relative to the side segment 116 against the biasing force of the tensioned cable 190 until the grip portion 118 reaches its unfolded position. Once the grip portion 118 is in the unfolded position, the latch 172 biased by the spring 174 can lock the grip portion 118 in position.

Advantages of the structures and constructions described herein include the ability to provide a child stroller apparatus that can be conveniently folded with reduced effort.

Realizations of the child stroller apparatuses have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. A child stroller apparatus comprising:
    a rear leg frame having a first side segment fixedly connected with a first coupling part;
    a front leg frame having a second side segment fixedly connected with a second coupling part, and a handle frame having a third side segment fixedly connected with a third coupling part, the second and third coupling parts being respectively connected pivotally with the first coupling part;

a front guard pivotally connected with the first coupling part;

a first linking assembly rotationally coupling the second side segment with the third side segment so that the front leg frame and the handle frame are rotatable in unison relative to the rear leg frame; and a second linking assembly rotationally coupling the front guard with the second side segment so that the front leg frame and the front guard are rotatable in unison relative to the rear leg frame, thereby the front leg frame, the handle frame and the front guard are linked and are rotatable relative to the rear leg frame during folding and unfolding of the child stroller apparatus.

2. The child stroller apparatus according to claim 1, wherein the first linking assembly includes a gear respectively engaged with the second and third coupling parts, and the second linking assembly includes a linking member respectively connected pivotally with the front guard and the second coupling part, such that the front leg frame, the handle frame and the front guard are rotatable in unison relative to the rear leg frame during folding and unfolding of the child stroller apparatus.

3. The child stroller apparatus according to claim 1, wherein the first linking assembly includes a first toothed portion provided on the second coupling part, a second toothed portion provided on the third coupling part, and a gear respectively engaged with the first and second toothed portions.

4. The child stroller apparatus according to claim 3, wherein the second coupling part includes a first arcuate slot and the third coupling part includes a second arcuate slot, the first toothed portion being disposed adjacent to an inner rim of the first arcuate slot and the second toothed portion being disposed adjacent to an outer rim of the second arcuate slot, the gear being movable along the first and second arcuate slots during folding and unfolding of the child stroller apparatus.

5. The child stroller apparatus according to claim 3, wherein the second and third coupling parts are respectively connected pivotally with the first coupling part about a first pivot axis, and the first and second toothed portions respectively extend along two concentric arcs that are centered on the first pivot axis.

6. The child stroller apparatus according to claim 5, wherein the front guard is pivotally connected with the first side segment about a second pivot axis spaced apart from the first pivot axis, and the gear is rotatable relative to the front guard about the second pivot axis.

7. The child stroller apparatus according to claim 1, wherein the second linking assembly includes a linking member respectively connected pivotally with the front guard and the second coupling part.

8. The child stroller apparatus according to claim 1, further including a latch assembled with the first coupling part, the latch being operable to engage with at least one of the second and third coupling parts for locking the rear and front leg frames, the handle frame and the front guard in an unfolded state for use.

9. The child stroller apparatus according to claim 8, wherein the latch is slidably assembled with the first coupling part and is connected with a spring, the spring biasing the latch to a locking state.

10. The child stroller apparatus according to claim 9, wherein the latch is connected with a release member that extends transversally across a width of the child stroller apparatus, the release member being operable to urge the latch to move from the locking state to an unlocking state.

11. The child stroller apparatus according to claim 1, wherein the handle frame further includes a grip portion fixedly connected with a first joining part, the third side segment is further fixedly connected with a second joining part that is pivotally connected with the first joining part.

12. The child stroller apparatus according to claim 11, further including a cable that has two opposite ends respectively anchored with the grip portion and the third segment and wraps around a prominent portion provided on one of the first and second joining parts, the cable being tensioned so as to bias the grip portion to fold toward the third side segment.

13. The child stroller apparatus according to claim 12, wherein one of the two opposite ends of the cable is connected with a cable anchor that is slidably assembled with the grip portion and is connected with a spring, the spring biasing the cable anchor away from the prominent portion for tensioning the cable.

14. The child stroller apparatus according to claim 12, wherein the prominent portion is a rounded portion of the second joining part and is received at least partially in the first joining part, and the cable wraps in contact with the prominent portion.

15. The child stroller apparatus according to claim 11, wherein the handle frame is further assembled with a second latch disposed in an inner cavity at least partially defined by the first and second joining parts, the second latch being operable to lock the grip portion in an unfolded position with respect to the third side segment.

16. The child stroller apparatus according to claim 15, further including a cable actuator respectively connected pivotally with the first coupling part and the third coupling part, a release actuator connected with the second latch, and a second cable respectively connected with the release actuator and the cable actuator, wherein a folding rotation of the handle frame relative to the rear leg frame results in the cable actuator pulling on the second cable so that the release actuator drawn by the second cable contacts with the second latch and urges the second latch to unlock the grip portion with respect to the third side segment.

* * * * *